US006760781B1

(12) United States Patent
Wang et al.

(10) Patent No.: US 6,760,781 B1
(45) Date of Patent: Jul. 6, 2004

(54) INTELLIGENT PACKET TRANSMISSION ENGINE

(75) Inventors: Chi-Lie Wang, Sunnyvale, CA (US); Ngo Thanh Ho, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/505,069

(22) Filed: Feb. 16, 2000

(51) Int. Cl.[7] ............................................... G06F 15/16
(52) U.S. Cl. ...................... 709/250; 709/226; 709/235; 709/237; 709/243; 710/53; 714/748; 713/322; 370/216; 370/336
(58) Field of Search ................................ 709/250, 243, 709/235, 237, 226; 713/322; 714/748; 710/53; 370/316, 336

(56) References Cited

U.S. PATENT DOCUMENTS

| 5,444,718 A | * | 8/1995 | Ejzak et al. ................. 714/748 |
| 5,487,072 A | * | 1/1996 | Kant ........................... 714/748 |
| 5,841,988 A | * | 11/1998 | Chennubhotla et al. ..... 709/237 |
| 6,021,124 A | * | 2/2000 | Haartsen ...................... 370/336 |
| 6,138,189 A | * | 10/2000 | Kalkunte ...................... 710/53 |
| 6,163,869 A | * | 12/2000 | Langmann ................... 714/748 |
| 6,327,625 B1 | * | 12/2001 | Wang et al. ................. 709/235 |
| 6,389,479 B1 | * | 5/2002 | Boucher et al. ............. 709/243 |
| 6,393,483 B1 | * | 5/2002 | Latif et al. ................... 709/226 |
| 6,519,223 B1 | * | 2/2003 | Wager et al. ................ 370/216 |
| 6,546,496 B1 | * | 4/2003 | Wang et al. ................. 713/322 |

OTHER PUBLICATIONS 10 pages from 3Com website entitled "Enhancing Enterprise Security".

"10/100 Mbps Fast Ethernet PCI Network Interface Card 100 Mbps Performance Benchmark Comparison" by LanQuest Labs dated Jan. 1998 consisting of 4 pages.

10 pages from 3Com website entitles "3Com Corporation Fast EtherLink Server NIC (3C980–TX) Competitive Evaluation".

4 pages from 3Com website entitled "Introducing the 3CR990–TX–97 10/100 PCI NIC with 3XP processor".

2 pages from 3Com website entitled "3Com EtherLink 10/100 Mbps Desktop Network Interface Cards".

2 pages from 3Com website entitled "Fast EtherLink Server Network Interface Card".

* cited by examiner

*Primary Examiner*—Jack B. Harvey
*Assistant Examiner*—Hai V. Nguyen
(74) *Attorney, Agent, or Firm*—Mark A. Haynes; Haynes Beffel & Wolfeld LLP

(57) ABSTRACT

Autonomous retransmission of data packets onto a network from a Network Interface Card level upon command from a host processor is support. Efficient FIFO buffering in an ASIC is retained. Uses for autonomous retransmission include hardware and software testing and in network management. One unique process includes:

(a) downloading at least one data packet from the host processor to a buffer;

(b) storing a parameter indicating a number of retransmissions;

(c) transferring packets from the buffer toward the network until all packets of the at least one data packet have been transferred towards the network; and (d) checking a parameter stored on the network interface apparatus, and in response to a particular value of the stored parameter indicating no retransmission, ending the transferring, and in response to other values of the stored parameter, repeating transferring of a last packet in the buffer until the number of retransmissions has been executed or until the host processor commands a cessation of the transferring.

21 Claims, 5 Drawing Sheets

INTELLIGENT PACKET TRANSMISSION ENGINE

RELATED APPLICATION

This application is related to commonly owned U.S. patent application Ser. No. 09/451,395, entitled "FIFO-BASED NETWORK INTERFACE SUPPORTING OUT-OF-ORDER PROCESSING", filed Nov. 30, 1999, inventors Chi-Lie Wang, Li-Jau Yang, Ngo Thanh Ho.

BACKGROUND OF THE INVENTION

1. Field of the Invention

The present invention relates to computer networks and to interface devices for connecting host computers to networks. More particularly the present invention relates to the retransmission of traffic by network interface cards (NICs) in network connected systems.

2. Description of Related Art

Computer systems that include network interfaces that support high speed data and status message transfers between a host computer and a data network are old. Local Area Networks (LANs) are a well known class of data network and are typically high speed networks constructed at low cost. Usage of low cost networks based on Carrier-Sense Multiple-Access with Collision Detection (CSMA/CD) techniques, such as Institute of Electrical and Electronic Engineers standard number 802.3 (IEEE 802.3) and ETHERNET(TM) is commonplace.

Typical implementation of ETHERNET and the like on popular Personal Computers (PCs) includes an adapter commonly termed a Network Interface Card (NIC). Such adapters typically connect to a PC via a bus such as the well known PCI, PCMCIA etc. NIC attachment to ETHERNET/IEEE 802.3 is according to one of the well known standards in the art, such AUI, 10Base2, 10BaseT, 100BaseT, various other 100 Megabit standards, or even Gigabit ETHERNET.

NICs typically have semiconductor read-write random access memory arrays (RAM) so that data transfers to and from the host memory are anisochronous to transfers to and from the LAN circuit or circuits. Such RAM is typically arranged as at least two first-in-first-out buffers (FIFOs). Thus, packets coming into the NIC, from the host memory, are stored in a first FIFO pending transmission onto the LAN. Conversely, packets coming into the NIC from the LAN are stored in a second FIFO, pending transfer into the host memory. The FIFO structure is a popular and efficient, high throughput system for managing high speed network interfaces. The efficiency and high throughput have come at the cost of flexibility in the operation of network interfaces. For example, once a packet has been downloaded to the interface, the host loses control over the processing of the packet. Thus, for example, if a host desires to send a packet repeatedly, the host process must manage repeated transmit requests. Also, if more than one process is sharing a network interface, then the contents of the FIFO in the network interface is unpredictable. Thus, schemes for downloading functions from the host to the network interface are difficult in high throughput environments using FIFO's or other network interface managed memory.

Accordingly, it is desirable to enhance the functionality of a network interface without sacrificing the high throughput efficiency of FIFO based, or other buffer architecture based, structures.

SUMMARY OF THE INVENTION

The present invention provides support for autonomous repeated transmission of data packets in a transmit buffer by a NIC. The present invention supports such retransmission by allowing commands from a host processor, or other source, for such purpose, without reducing the efficiency of the transmit path through the NIC. In addition an order to stop retransmission is provided.

One aspect of the present invention is a computer system that includes a host computer processor and a network interface apparatus having a first port coupled to the host processor and a second port adapted for transmitting data to a network. A buffer is coupled to the first and second ports and stores data packets from the first port. The buffer comprises a first-in-first-out buffer in one aspect of the invention. Logic based circuitry is included in the network interface. The circuitry responds to data and command signals from the host and stores packet data and other information in the buffer and, in preferred embodiments, in registers. The circuitry also transfers packets out of the buffer to the second port according to the information stored in the buffer and/or the registers so that certain packets may be repeatedly transmitted. Such retransmission is independent of retried transmissions that may be imposed by the MAC in response to collision conditions.

In one embodiment, the host processor generates a test packet of data, sometimes referred to as test patterns, as may be used for example to test NIC hardware in a manufacturing environment or for performance testing. The test packet is downloaded to the FIFO buffer in the NIC, along with a command to repeat transmission of the packet a number of times, or indefinitely until a stop command is issued by the host. When the test packet reaches the top of the FIFO, it is transmitted repeatedly without further host intervention. So even if the host powers down or crashes, the retransmission proceeds.

In another embodiment, different types of test packet are used with (1) autonomous retransmission by the NIC and (2) retransmission supervised by the host. This can help with isolating faults and other troubleshooting. A further utility is for separately or concurrently burning-in memory and analog components in the NIC such as part of an acceptance test. In a still further embodiment, failure conditions in the host may allow the host to command, for example, the perpetual retransmission of a "trap" message in accordance with Simple Network Management Protocol (SNMP), thus raising a network alarm condition even if the host were to shut down completely (assuming power is still available to the NIC). For information on the use of SNMP, see for example Internet Engineering Task Force Request for Comment 1213 (IETF RFC 1213).

Furthermore, the described embodiments operate in a manner that allows a NIC to operate with host device drivers that are unaware of the retransmission features so as to provide backwards compatibility at the host software, host hardware and the network interface levels.

Other aspects and advantages of the present invention can be seen upon review of the figures, the detailed description, and the claims which follow.

DETAILED DESCRIPTION

A detailed description of embodiments of the present invention is presented with reference to FIGS. 1 through 5.

Figure 5:
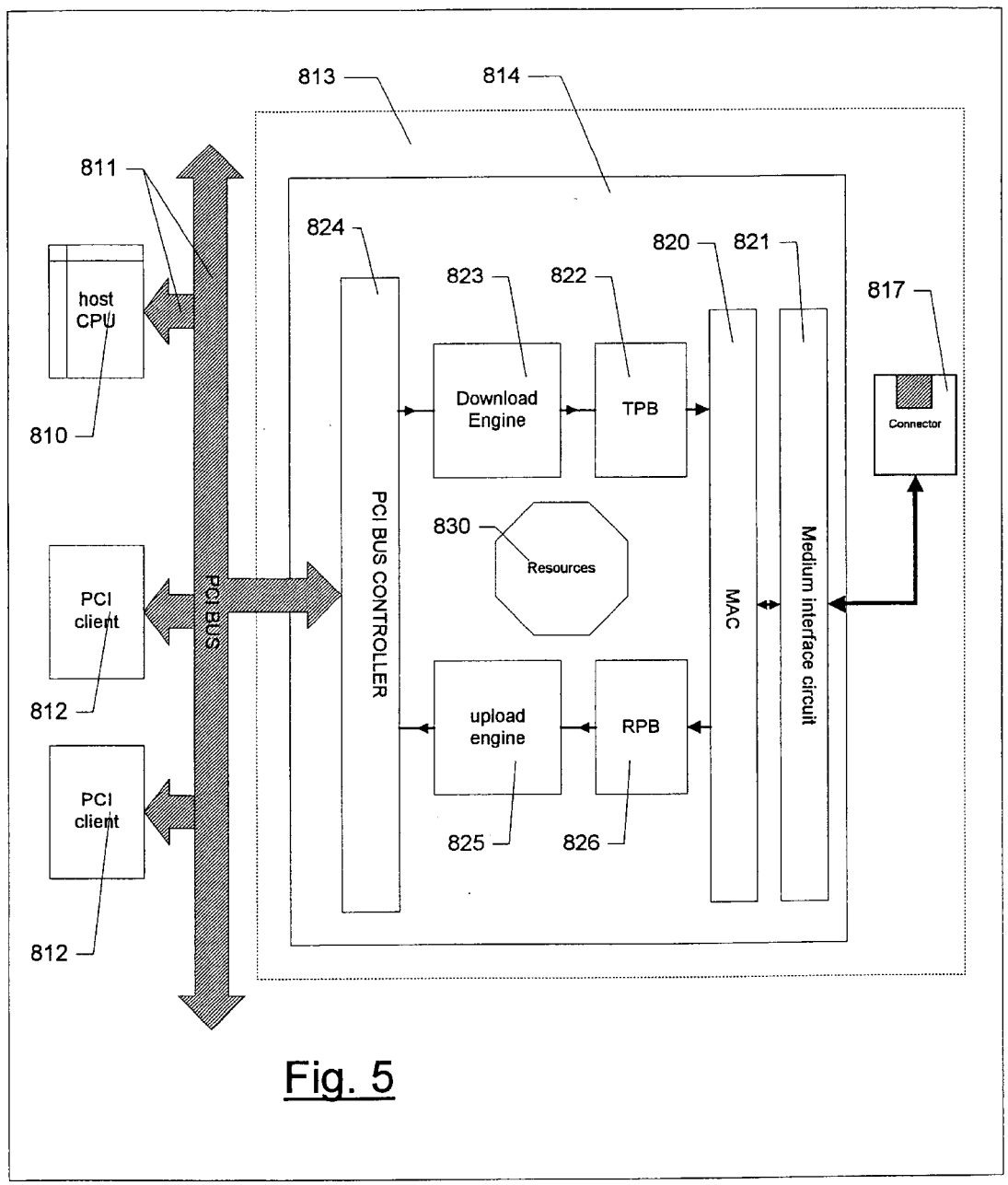
FIG. 5 is a simplified diagram of a computer system including the network interface of the present invention.

FIG. 5 provides a basic structural diagram of an embodiment of a computer system having a host CPU 810 coupled to a PCI bus system 811. PCI buses are well known in the Personal Computer arts. The bus 811 interconnects a plurality of PCI clients, including clients 812 and the NIC 813 shown with expanded functional blocks. The NIC 813 includes an application specific integrated circuit (ASIC) 814. The ASIC 814 includes network interface functions for an ETHERNET interface in this particular embodiment. Other embodiments provide interfaces to other types of the network media. In addition to the ASIC 814, other components are interconnected by and supported by the circuit board of the NIC 813. For example, a BIOS ROM (not shown), and a connector 817 to the LAN (not shown) may be found on the circuit board of the NIC 813.

The ASIC 814 includes a MAC structure 820 coupled to medium interface circuitry 821 for connection to connector 817 which may be of the common type known as RJ-45. The MAC structure 820 is also coupled to a FIFO based transmit packet buffer (TPB) 822 which is driven by a download engine 823 embodied on the ASIC 814. The download engine 823 is coupled to a PCI bus controller 824. The PCI bus controller 824 is also coupled to an upload engine 825. The upload engine 825 is coupled to a FIFO based receive packet buffer (RPB) 826 which is connected to the MAC structure 820. In FIG. 5, the arrows on the lines connecting the boxes 820, 821, 822, 823, 824, 825 and 826 indicate the directions of data flow. Thus, the illustration of the ASIC 814 includes ordinary elements of a network interface controller chip.

Still referring to FIG. 5, the ASIC 814 further includes Resources 830 coupled to packet buffers 822 and 826, and to the upload and download engines 824 and 825, for managing the transferring of packets through the packet buffers and particularly the iterative transfers out of the transmit packet buffer as described in detail below.

Figure 1:
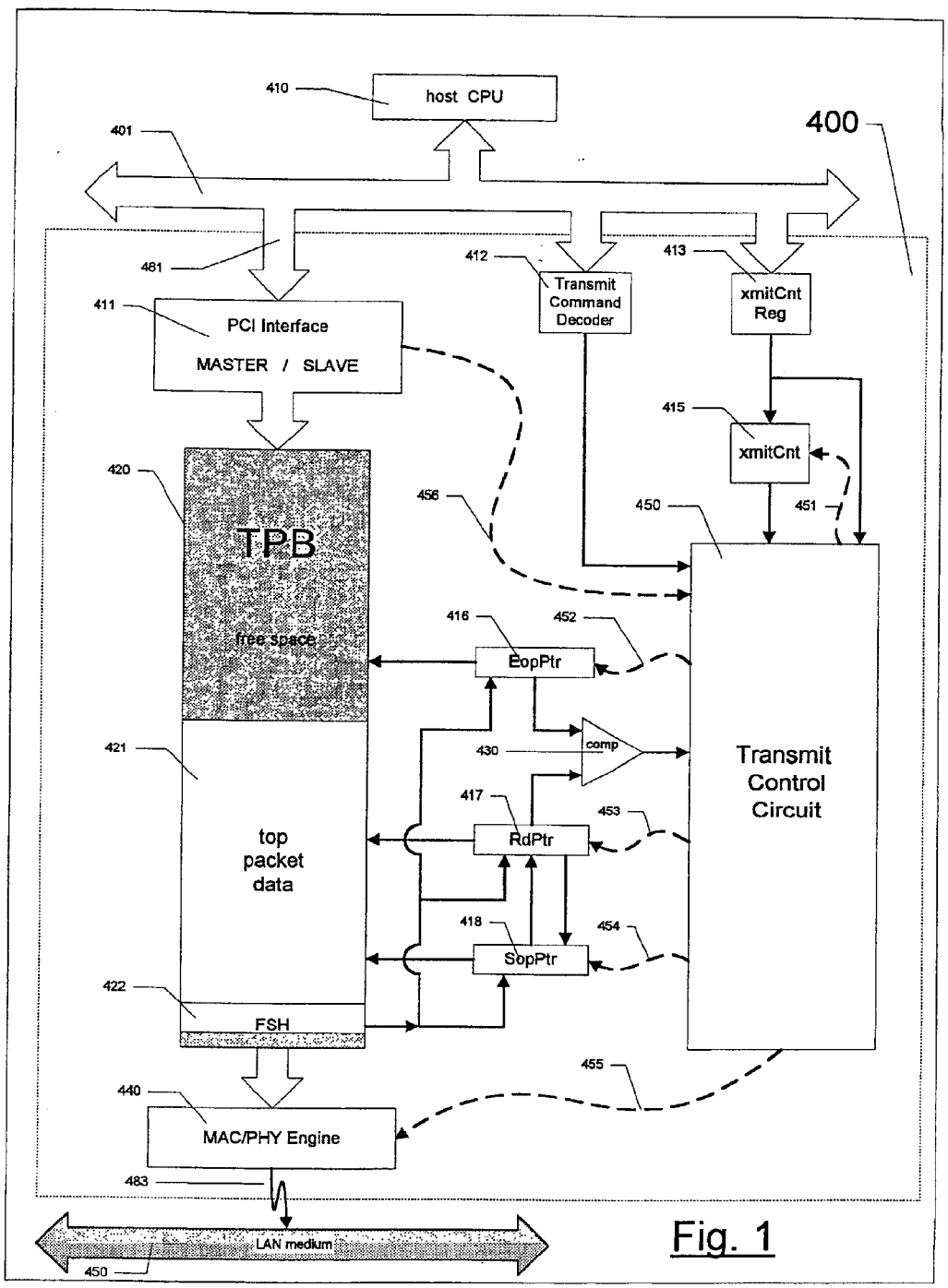
FIG. 1 provides a simplified block diagram of an integrated circuit supporting packet retransmission according to the present invention.

FIG. 1 provides a conceptual diagram of a system implementing the invention, including a host CPU 410 coupled to a PCI bus 401 and an integrated circuit 400 (such as ASIC 814 in FIG. 5) including the logical circuitry for transferring data packets into and out from a TPB 420 according to the present invention. For simplicity, only parts of the circuit that relate to the host-to-LAN transfer (data transmit) direction and that relate to the invention are shown. The circuit will ordinarily also implement a signal and data counter-flow to implement a signal receive direction capability using other components. Certain components may be shared by both signal transmit and signal receive direction capabilities of the integrated circuit. In addition embodiments will ordinarily include other features that are old and not pertinent to the description of present invention.

The integrated circuit 400 includes a PCI interface 411 that has two aspects—a PCI Slave and a PCI Master (these are not separately shown as they are closely interwoven). The PCI interface is coupled to first port 481 so that it may exchange data and control signals with the PCI bus 401. The PCI interface 411 is further coupled to a Transmit Packet Buffer (TPB) 420 so that data may be loaded from the PCI interface 411 to the TPB. The TPB 420 is coupled to a Medium Access Control/Physical Layer Driver (MAC/PHY) engine 440 to transfer data from the TPB to the MAC/PHY engine. The MAC/PHY engine is coupled via a second port (483) onto the transmission medium (typically electrical wire) 450.

The PCI Slave part of the PCI Interface 411 performs such functions as determining whether to accept a command from the host CPU and, in response, passing control signals (pecked line 456) to a Transmit Control circuit 450. By these means, the host 410 originates and the Transmit Control circuit 450 responds to encoded transactions for such functions as initializing integrated circuit registers, checking status, handling interrupts and controlling data movement.

Data incoming to the NIC from the host computer, via port 481, is downloaded via the PCI Master part of the PCI interface 411 into the TPB 420. These downloaded packets of data are eventually forwarded to the MAC/PHY engine 440 which converts the packets to conform with IEEE 802.3 data link layer protocol. Copies of the packets then pass through the Physical Layer Interface (483) and onto the transmission medium 450.

Still referring to FIG. 1, the TPB 420 operates as a First In First Out buffer (FIFO), with a topmost packet having a top packet Frame Start Header (FSH) 422 and a top packet data 421, in accordance with well known FIFO handling techniques. The shaded portion of the TPB 420 represents buffer free space in a preferred embodiment. The Integrated Circuit further includes several pointer registers used to address the TPB. These include an End-of-Packet Pointer, EopPtr 416; a Start-of-Packet Pointer SopPtr 418; and a Read Pointer 417. The use of each of these pointers is controlled by control signals 452, 454 and 453 respectively, the control signals being directed by the Transmit Control circuit 450. EopPtr 416 and RdPtr 417 are coupled to the inputs of a comparator 430, the comparator's output is coupled to the Transmit Controller 450 so that the Transmit Controller may determine the equality or inequality of EopPtr and RdPtr. As indicated in FIG. 1, EopPtr, RdPtr and SopPtr may each be loaded from memory locations in the FSH 422, and the contents of RdPtr and SopPtr may be loaded from one to the other, in either direction; all of these load operations being directed by control signals (such as 452, 453, 454) from the Transmit Controller.

Again referring to FIG. 1, the Integrated Circuit further includes a Transmit Command Decoder 412 coupled to the PCI bus, the Transmit Command Decoder 412 can decode Transmit Commands originating in the host CPU, and in response to such commands, the Transmit Command Decoder impresses a stimulus onto the Transmit Controller 450. The Transmit Count Register (xmitCntReg) 413 is a 16 bit register that may have a value loaded into it under host CPU control via the PCI bus 401. The value of the Transmit Count Register (xmitCntReg) 413 may be transferred under signal control (451) to the Transmit Counter (xmitCnt) 415. Moreover the Transmit Control may command the clearing of the contents of the xmitCntReg.

Figure 2:
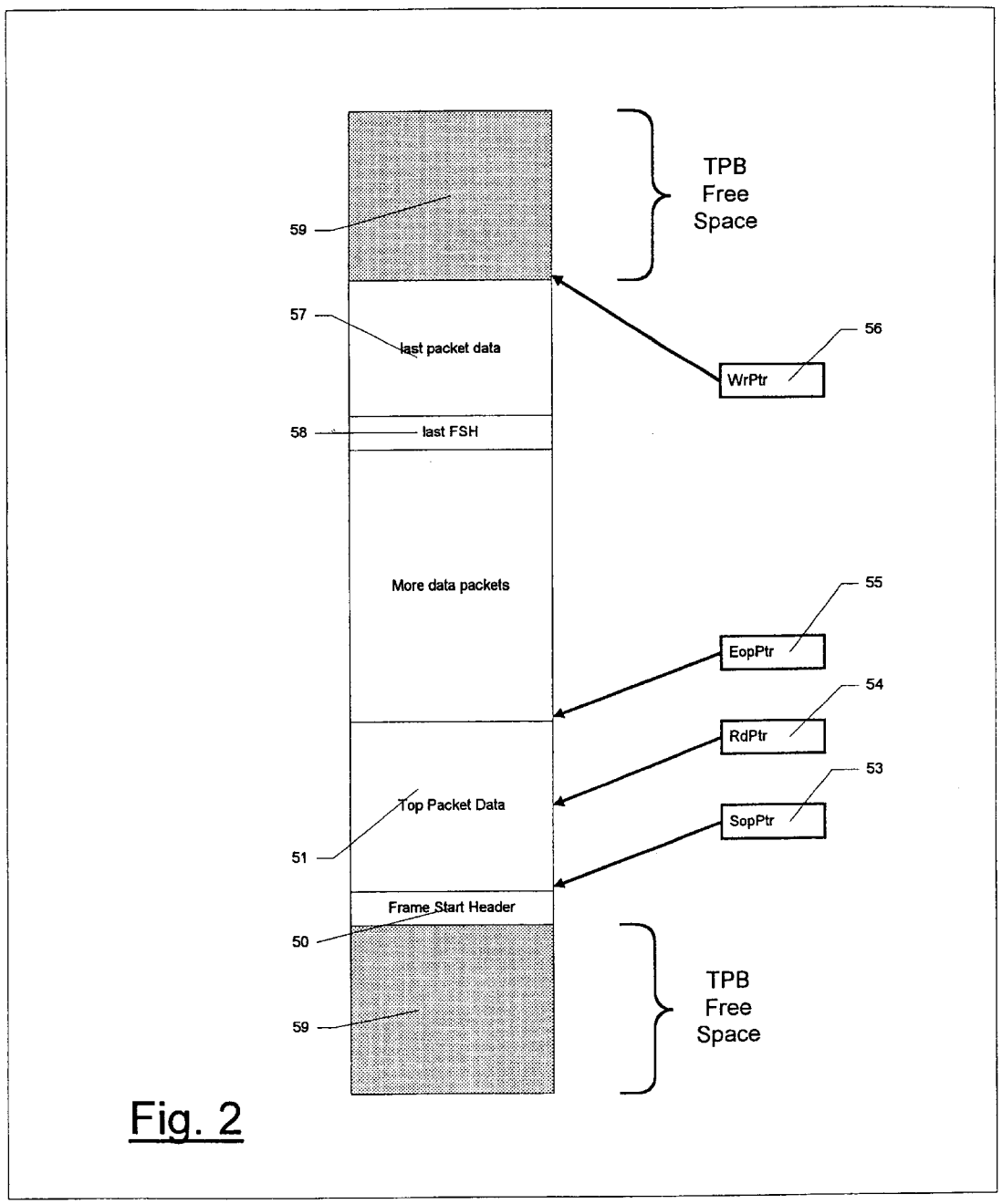
FIG. 2 illustrates data structures used in the FIFO based transmit packet buffer (TPB) in the system of FIG. 1.

FIG. 2 illustrates the data structures and pointers for a TPB (such as 420 in FIG. 1). The topmost packet includes a top packet frame start header (FSH) 50 and top packet data 51. A start of packet pointer SopPtr 53 points to the first data byte in the top packet data field 51. A read pointer RdPtr 54 points to a location in the buffer for a current read position. An end of packet pointer EopPtr 55 points to the first byte after the end of the top packet data field 51. The data structures also include a write pointer WrPtr 56 for data being loaded into the buffer in a current packet data field 57 in the illustrated example. Upon the beginning of the loading of the current packet, a current packet frame start header (FSH) is set up in field 58. The current packet frame start header is set up when the current packet begins loading into the buffer. It carries a control parameter indicating whether the frame start header contains valid data. This parameter initially will indicate that the frame start header is a "null" header. Upon completion of the current packet download operation when the end of packet pointer information is stored, this parameter is set to indicate a valid packet. The TPB includes free space 59.

Packets downloaded from the host may consist of multiple fragments and each fragment may be located in different parts of host memory. Data downloading is started by fetching the address and the length information of each fragment, followed by downloading the packet data from host memory to TPB. This act repeats until all the fragments of each packet are downloaded.

In a preferred embodiment, the FSH includes a status bit which when zero indicates that the header is a so-called null header. This null header is ignored as a candidate for transmission onto the network until the status bit is set to binary one. Control parameters are carried in each FSH, or (in certain alternative embodiments) otherwise associated with packets in the buffer.

Figure 3:
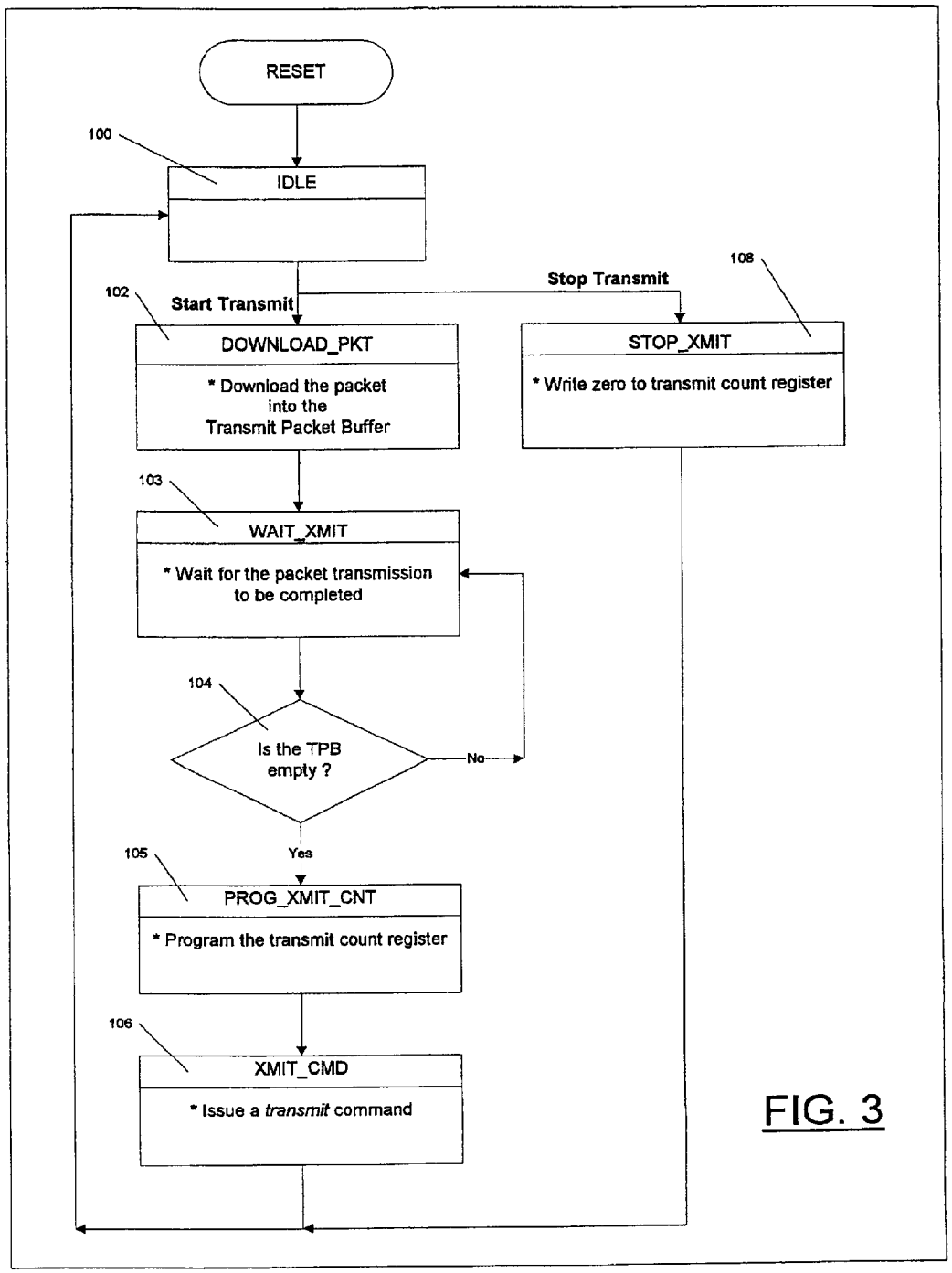
FIG. 3 is a flow diagram illustrating the functioning of the download side of the Transmit Controller in the system of FIG. 1.

FIG. 3 illustrates one embodiment of the operation of the host flow (also known as "download") side of Transmit Controller (TC) 450 for the system of FIG. 1.

Referring to FIG. 3, in this embodiment, the TC is implemented as a fixed logic state machine process. This process includes an "Idle" state 100. In the "Idle" state 100, the process waits for either a "Start Transmit" or a "Stop Transmit" command to be received from the host via the PCI bus controller. In response to receipt of a "Start Transmit" command a transition to a "Download Packet" state 102 is made. The TC causes an FSH to be set up in the TPB including a Status Bit indicating an incomplete packet. Downloading of data packet into the TPB from the host occurs across the PCI bus in state 102. State 102 is mostly implemented as the Master side of the PCI Interface. Still referring to FIG. 3, after the data have been downloaded, but before leaving state 102, the Status bit in the FSH is set to binary one thus indicating that there is (at least) one packet in the TPB. Upon completion of the "Download Packet" state 102, transition is made to the "Wait Xmit" state 103 wherein the host flow side of the TC waits for completion of transmission of the data onto the LAN. In alternative embodiments this wait may be incorporated into the TC Idle state and downloading of further packets may occur while the Packet Transmission Controller is transmitting the data out onto the LAN. When the TPB is detected as being empty (diamond 104), in the "Prog Xmit Cnt" state 105 Transmit Count Register (xmitCntReg) is programmed by the host via the PCI bus. In the "Xmit Cmd" state 106, a "Transmit Command" is issued to the other side of the Transmit Controller (described infra), and thereafter control returns to the Idle state 100.

In the event that a "Stop Transmit" command is received from the host via the PCI bus, then from the Idle state 100, transition is made to the "Stop Xmit" state 108 wherein the xmitCntReg is cleared to a zero value and control returns to the Idle state. Writing zero to the xmitCntReg has the effect of terminating any retransmission to the LAN in an orderly manner. If no retransmission is required then the host will either not send a value to the xmitCmdReg, or alternatively may program an xmitCntReg value of zero.

Figure 4:
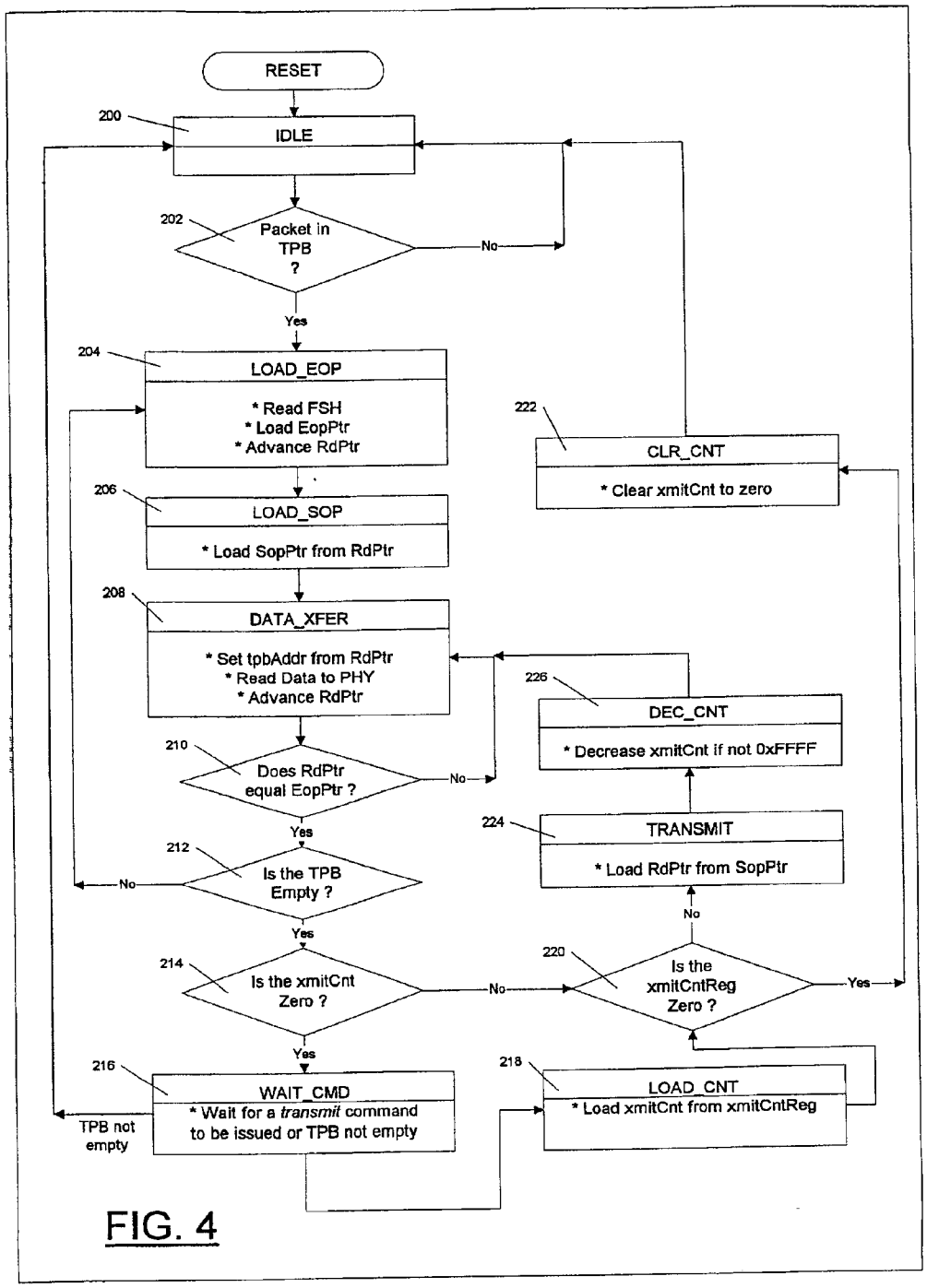
FIG. 4 is a flow diagram illustrating the functioning of the transmit side of the Transmit Controller in the system of FIG. 1.

FIG. 4 illustrates a preferred embodiment of the operation of the Packet Transmission side of the Transmit controller system of FIG. 1, this operation essentially involves moving data from the TPB to the MAC/PHY layer in an orderly manner. Referring to FIG. 4, the process begins in state "IDLE" 200. From the "IDLE" state, a continual test is made as shown in diamond 202 and when a completed packet has downloaded into the TPB, the process proceeds to state "LOAD_EOP" 204 in which it reads the top FSH to load various registers from the FSH. This register loading is implemented as preprogrammed logical circuitry in the TC by advancing the RdPtr as each register is loaded. Particularly relevant is that the EopPtr register is loaded. Still in the "LOAD_EOP" state 204, the RdPtr is advanced so as to take it beyond the end of the FSH and to index (or point to) the beginning of the top packet data. Upon next state transition to state "LOAD_SOP" 206 the SopPtr register is loaded from the RdPtr register. This operation effectively permits the value of RdPtr to be saved in SopPtr so that it may be reloaded later with the start of packet address in order to effect retransmission of the packet. Still referring to FIG. 4, upon transition to the "DATA_XFER" state 208 the packet data is read out one word (i.e. one byte in the present embodiment) at a time and transferred to the MAC/PHY layers to be transmitted out onto the network. After each read, the RdPtr register is incremented so as to point to the next word location in the TPB. Then in diamond 210, the RdPtr is tested for equality to the EopPtr. If unequal, the packet is not yet completely sent to the physical layer and control returns to the "DATA_XFER" state 208. Upon completion, a check is made (diamond 212) to see whether more packets are queued up in the TPB, if so control returns to the "LOAD_EOP" state 204 to process the next packet. Thus it can be seen that, in this embodiment, even if a packet is marked for retransmission, it will not be retransmitted (or will no longer be retransmitted) if another packet is downloaded for subsequent transmission. This approach provides both a programming convenience in the host and a reduced resource cost in the NIC ASIC.

Still referring to FIG. 4, after it has been determined (diamond 212) that the TPB contains no new (i.e. untransmitted) packets, then in diamond 214 a test is made to see whether a transmit counter (xmitCnt) is zero. This xmitCnt will have been initialized to zero at reset and, as discussed infra, may be modified thereafter. However xmitCnt remains zero if the retransmission feature is never invoked by the host. Not all hosts implement retransmission and NIC compatibility with older host software is desirable. If the xmitCnt is zero then control passes to state "WAIT_CMD" 216 and the process waits for either a Transmit Command to be received from the download side of the TC or for completion of download of a further packet— whichever occurs first. The state machine ordinarily stalls in WAIT_CMD state waiting for the next packet if there was no retransmission requested. It also stalls in the WAIT_CMD state waiting for the next packet if the requested number of transmissions has been completed after issuance of a transmit command. Transmit Command was discussed supra in connection with FIG. 3. Once a transmit command has been detected, control passes to state "LOAD_CNT" 218, and xmitCnt is setup from the Transmit Count Register (xmitCntReg) that was set by the host via the PCI bus contemporaneously with issuing its Transmit Command.

In diamond 220 a test is made for the value of the xmitCntReg and if zero, then xmitCnt is cleared to zero in state "CLR_CNT" 222 and transition is made to the "IDLE" state 200. The xmitCntReg could be zero because either (i) no retransmission was requested, or (ii) a host stop_transmit command was received. If, in diamond 220, the xmitCntReg was found to be non-zero then a repeated transmission is required and state changes to "TRANSMIT" 224. In state "TRANSMIT" 224, the RdPtr is reloaded from the SopPtr to point to the start of data in the packet most recently transmitted. In state "DEC_CNT" the xmitCnt is decremented as an iteration counter unless it contains the special value 0xFFFF which is a code for retransmit indefinitely. Indefinite retransmission can be terminated by a host stop_transmit command.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. The following are but examples of modifications and combinations:

The special value in the iteration counter is not critical, it could be any convenient value.

A separate register or latch could be used to indicate a request for indefinitely many transmissions.

The number of transmissions requested could be inexact, using for example a binary weighting or an exponent.

The iteration counter could be an up-counter or a down-counter with equal facility, and could be scaled by a number other than unity. If not a down-counter as alluded to supra, it would be adjusted other than by simple decrementing.

The TPB could be other than octet-wide memory, in which case advancing a pointer to it could be other than simple incrementing.

The TPB could be addressed by a more sophisticated technique such as base and displacement pointers, segments registers or etc., but manipulated in an analogous manner to that disclosed and yet still be within the general scope of the invention.

Fixed logic state machines mentioned above may be replaced by general purpose processor modules on the ASIC, or in communication with the ASIC, under software control, or by a combination of software controlled processor modules and logic circuits.

What is claimed is:

1. A computer system, comprising:
a host processor, and
a network interface coupled to the host processor, the network interface comprising:
a first port that receives data packets from the host processor;
a second port that sends the data packets to the network;
a buffer that stores the data packets received by the first port, the buffer being coupled to the first port and to the second port; and
a control circuit that transfers, from the buffer to the second port, a plurality of copies of a particular data packet in the buffer, in response to a command from the host processor, the command being associated, with a parameter specifying a number of copies, the number being at least two.

2. The computer system of claim 1, wherein the buffer comprises a first-in-first-out buffer, and logic managing flow of data packets through the buffer according to a first-in-first-out process.

3. The computer system of claim 1, wherein the parameter comprises a specification selected from a list including
indefinitely many copies; and
a particular finite number of copies.

4. The computer system of claim 1, including a store coupled to the control circuit, and wherein the command consists of act resulting in storing the parameter in the store.

5. The computer system of claim 1, further comprising:
a register for receiving the specification and
a decoder for receiving the command.

6. The computer system of claim 1, wherein the second port further comprises circuitry for formatting data packets according to a protocol compliant with an Ethernet protocol standard.

7. The computer system of claim 1, wherein, in response to receiving a further specification of copies, the control circuit ceases to transfer.

8. The computer system of claim 4, further comprising a PCI interface comprising
a PCI master circuit that receives the packets; and
a PCI slave circuit that receives the parameter.

9. In a network interface apparatus, a method for managing transfer of data packets between host processor and network comprising:
storing a particular data packet in a buffer on the network interface apparatus;
receiving a command at the network interface apparatus to transmit the particular data packet in the buffer repeatedly, and
repeatedly transferring from the network interface apparatus to the network in response to the received command, the particular packet in the buffer until the particular data packet has been transmitted a number of times indicated by a parameter associated with the command, wherein the parameter indicates a finite number, the finite number being at least two.

10. The method of claim 9, further comprising:
stopping the repeatedly transferring in response to receiving further command.

11. The method of claim 9, wherein said buffer comprises a first-in-first-out buffer.

12. The method of claim 9, wherein the parameter has a value indicating indefinitely many copies.

13. The method of claim 9, including said repeatedly transferring when the host processor is disabled.

14. In a network interface apparatus, a method for managing transfer of data packets between a host processor and a network, comprising:
(a) downloading a particular data packet from the host processor to a buffer;
(b) storing a parameter indicating a number of retransmissions;
(c) transferring the particular data packet in a plurality of data packets from the buffer toward the network until all data packets in the plurality of data packets including the particular data packet have been transferred toward the network; and
(d) checking the parameter stored on the network interface apparatus, and in response to a particular value of the stored parameter indicating no retransmission, ending the transferring, and in response to other values of the stored parameter, repeating transferring of the particular data packet in the buffer until the number of retransmissions, wherein the number of retransmissions is finite number being at least two, has been executed or until the host processor commands a cessation of the transferring.

15. The method of claim 14, wherein the first series of acts further comprises copying the parameter to a counter, and decrementing the counter in response to each retransmission.

16. The method of claim 14, wherein the number of transmissions is indefinitely many copies.

17. The method of claim 14, wherein the storing of the parameter is executed by the host computer.

18. The method of claim 14, wherein the particular data packet comprises a test pattern.

19. The method of claim 14, wherein the particular data packet comprises an SNMP trap message.

20. The method of claim 14, including continuing said repeating transferring when the host processor is disabled.

21. An integrated circuit for use in a network interface for a host computer, comprising:

a first port for receiving a plurality of data packets from the host computer;

a second port for transmitting the plurality of data packets to the network;

a buffer coupled to the first port and the second port;

a decoder for receiving from the host computer, a command to transmit particular data packet in the plurality of data packets according to a specification of copies selected from a list consisting of:
  indefinitely many copies and
  a particular finite number of copies, the number being at least two; and a circuit that transfers the plurality of data packets towards the network in a first-in-first-out order, and repeatedly transfers, towards the network, the particular data packet until the particular data packet has been transmitted according to the specification of copies.

* * * * *